United States Patent [19]

Oust

[11] Patent Number: 5,032,412

[45] Date of Patent: Jul. 16, 1991

[54] FOOD PRODUCT AND METHOD OF MAKING IT

[76] Inventor: Benny Oust, 24455 Lakeshore Blvd., #511E, Euclid, Ohio 44123

[21] Appl. No.: 456,168

[22] Filed: Dec. 26, 1989

Related U.S. Application Data

[63] Continuation of Ser. No. 227,076, Aug. 1, 1988, abandoned.

[51] Int. Cl.$^5$ .............................................. A23L 1/00
[52] U.S. Cl. ................................... 426/89; 426/302; 426/438; 426/550; 426/615; 426/637
[58] Field of Search ............... 426/615, 637, 439, 438, 426/550, 302, 89, 94

[56] References Cited

U.S. PATENT DOCUMENTS

| | | | |
|---|---|---|---|
| 2,856,295 | 10/1958 | Scharf | 426/615 |
| 4,135,004 | 1/1979 | Finkel | 426/637 |
| 4,419,375 | 12/1983 | Willard et al. | 426/637 |
| 4,608,262 | 8/1986 | Galland | 426/637 |

*Primary Examiner*—Donald E. Czaja
*Assistant Examiner*—Mary S. Mims
*Attorney, Agent, or Firm*—George J. Coghill

[57] ABSTRACT

A food product comprising a prepared mixture of shredded potato and shredded cheese can be used as a substitute for the bread dough base in pizza. The product can be used immediately, or can be frozen for later baking as is typical of pizza bases.

12 Claims, No Drawings

FOOD PRODUCT AND METHOD OF MAKING IT

"This is a Continuation Application of U.S. Pat. Application Ser. No. 07-227,076, filed Aug. 1, 1988", now abandoned.

BACKGROUND OF THE INVENTION

1. Field of the Invention

This invention relates generally to the field of food products, and more particularly relates to a food product that can be used as a substitute for the bread dough base in a common pizza.

2. Description of the Prior Art

Pizza has been enjoyed for many years both in the United States and abroad. Traditional pizza comprizes a commonly known bread dough base, and typically it has a cheese and a tomato sauce topping. Other ingredients as well, such as mushrooms, sausage, pepporoni, onions, etc., are also typically added as toppings, by and large according to the preference of particular individuals.

The typical bread dough pizza base is commonly made from flour, yeast, salt and oil, and once prepared it can be used either immediately, or it can be frozen, with or without toppings, for later use in making pizza.

Although pizza has been considered a generally nutritious food, there are many individuals that, for health, dietary, or other reasons, should not consume bread products and/or the ingredients that go into them, and therefore many people could not eat traditional pizza made with a bread dough base.

Also, children have typically enjoyed pizza, but for similar reasons as stated above, some parents would prefer that their children not consume an excess of bread, and at the same time prefer that they consume more vegetable products in their diet.

Until the present invention, there has been no real convenient, nutritious, and tasty substitute for the bread dough base used in pizza. It is not known just how many attempts might have been made to develop a substitute, but none have become successful or generally known.

Any product which might be substituted for the bread dough base in pizza must meet certain criteria. It must be agreeable in taste and appearance. For convenience it should be capable of use either immediately or at a later time after freezing and generally it should not require more preparation or cooking time as compared to a bread dough base. When finally cooked, it must have enough "body" and/or stiffness so that the pizza will hold together when handled during preparation, during cooking, and during eating. Further, it is desirable that such a substitute would eliminate at least some of the dietary shortcomings of a bread dough base and the ingredients that traditionally have gone into it.

SUMMARY OF THE INVENTION

The present invention provides such a tasty, nutritious substitute for the bread dough base in a pizza and a method of making it. It comprises a mixture of shredded vegetable and shredded cheese in the proportions of between one part cheese to 2.5-10 parts vegetable by weight, which has been formed into a generally flat extended configuration, and fried. In a preferred embodiment, the vegetable is potato and the cheese is mozzarella.

The method includes the steps of: shredding the vegetable; shredding the cheese; mixing the shredded vegetable and the shredded cheese in a proportion of between one part cheese to 2.5 to 10 parts vegetable by weight; forming the mixture into a generally flat shape; and frying the formed mixture.

The invention can be more readily understood from the following detailed description.

DESCRIPTION OF THE PREFERRED EMBODIMENT

As generally noted above, the preferred embodiment of the pizza base of the present invention comprises basically potato and mozzarella cheese.

The potatoes are preferably peeled and then shredded into numerous thin elongated strips by any conventional means: either with a hand shredder as might be found in any typical household; or, for larger quantities, by suitable industrial equipment. The thickness of the strips is preferably on the order of 0.05" to 0.200", and their average length is preferably greater than, 0.300". Actual individual lengths, however, will somewhat be a function of the size of the potatoes being used and the particular part of the potato from which it comes.

The cheese is also shredded to the same average range of dimensions as noted above. Common mozzarella cheese, well known in the art, has been found to have acceptable taste characteristics, and advantageous physical properties as will be described in more detail below.

The word "shredding" as used here can include other methods of forming the vegetable and cheese into thin elongated pieces, such as extrusion, cutting, etc., and is not limited to any particular technique.

The shredded cheese and the shredded potatoes are mixed, either by hand or suitable equipment, into a substantially uniform randomly oriented mixture, but without excessive break up of the shredded ingredients. The proportion of ingredients can range from 1 part cheese to 2.5-10 parts potato by weight. A prefered ratio is 1 part cheese to 5 parts potato.

The mixture is formed into a suitable size base, usually round, and in a generally flat extended configuration typical of pizza bases, with a thickness of 0.25 to 1". This base is then fried, either "deep fried" in cooking oil, or "pan" fried, until the cheese has at least partially melted, and the flat surface has browned and crusted and has a glazed appearance. The pan frying can be done in a pan or on a skillet or on any other suitable flat heated surface. For pan frying, one or both sides can be browned. However, it is prefered to fry both sides. Frying both sides provides more stiffness and body, and results in a product that more closely simulates the stiffness and body of a traditional bread dough base.

The frying times can be varied somewhat depending on the frying temperature, but pan frying at 375 degrees Fahrenheit for 10 minutes or "deep frying" at 375 degrees Fahrenheit for 2-4 minutes has been found acceptable. Pan frying is preferred to minimize the oiliness of the final product, but deep frying is faster.

After frying, the base can either be used immediately, or it can be frozen for later use.

The desired toppings, (cheese, tomato sauce, etc.) are added to the top, and the pizza is baked similarly to bread dough pizza, typically at 350 degrees Fahrenheit for 20 to 25 minutes if not frozen or at 425 degrees Fahrenheit for 25-28 minutes if frozen.

By frying the mixture before baking, the cheese melts in its strip form, randomly intertwined with the potato strips, and it binds the potatoes together giving the base suitable body and stiffness to hold it together and allow it to be handled The frying also causes the cheese exposed to the flat surface of the base to be browned and form a somewhat crusty glaze which further binds the base together and gives added stiffness.

It will be apparent to those skilled in the art, that many variations to the basic invention will be possible. Other ingredients such as additional cheeses meats, vegetables, etc, might also be mixed into the base for flavor, without degrading its physical characteristics. Further, the cooking times and temperatures at the various stages can be varied with satisfactory results. It should also be noted that the present invention will have other uses in addition to its uses in a pizza.

Thus, the present invention provides a practical, nutritious substitute for the bread dough base in a common pizza, and many variations will be possible that will not depart from the scope of the invention, of which I claim:

1. A pizza comprising:
   a randomly oriented mixture of vegetable shredded into generally elongated pieces with an average length greater than 0.300 inches, and cheese shredded into generally elongated pieces with an average length greater than 0.300 inches, in the proportions of between one part cheese to 2.5–10 parts vegetable by weight, which has been formed into a generally flat extended configuration having upper and lower side surfaces, and fried;
   pizza sauce and selected toppings applied to the upper side surface of said formed and fried mixture and baked with said pizza sauce and selected toppings on the upper side surface of said formed and fried mixture.

2. The food product of claim 1 wherein the vegetable is potato and the cheese is mozzarella.

3. The food product of claim 2 wherein the formed mixture has been pan fried on at least one side.

4. The food product of claim 3 wherein the formed mixture has been fried long enough to at least partially melt the cheese and brown the fried flat surface.

5. The food product of claim 4 wherein both of said flat sides are fried.

6. A method of making pizza comprising the steps of:
   shredding a vegatable into elongated pieces having an average length greater than 0.003 inches;
   shredding a cheese into elongated pieces having an average length greater than 0.003 inches;
   mixing the shredded vegatable and shredded cheese in a proportion of between one part cheese to 2.5 to 10 parts vegetable by weight;
   forming the mixture into a generally flat extended configuration having flat upper-side and lower-side surfaces;
   frying the formed mixture;
   adding pizza sauce and selected toppings to an upper side of the fried mixture; and
   baking the fried mixture with the sauce and selected toppings on the upper side surface thereof.

7. The method of claim 6 wherein the vegetable is potato and the cheese is mozzarella.

8. The method of claim 6 wherein the step of forming the mixture further comprises the step of forming the mixture into a generally flat shape having two flat sides, and the step of frying includes the step of pan frying at least one side of the flat mixture until the cheese is at least partially melted and the fried surface is browned.

9. The method of claim 8 wherein the vegetable is potato and the cheese is mozzarella.

10. The method of claim 8 wherein the step of frying comprises frying both sides.

11. The method of claim 10 which further comprises the step of baking the mixture after it is fried.

12. The method of claim 11 wherein the vegetable is potato and the cheese is mozzarella.

* * * * *